United States Patent [19]

Wissman

[11] Patent Number: 4,782,621

[45] Date of Patent: Nov. 8, 1988

[54] INSECTICIDE BAIT HOLDER

[76] Inventor: Seth Wissman, 5605 Dittmar Pl., Dallas, Tex. 75229

[21] Appl. No.: 895,840

[22] Filed: Aug. 13, 1986

[51] Int. Cl.4 .............................................. A01M 1/20
[52] U.S. Cl. ......................................... 43/131; 43/133
[58] Field of Search ................. 43/131, 114, 121, 133, 43/136; 206/533, 529, 630; D22/122

[56] References Cited

U.S. PATENT DOCUMENTS

| | | |
|---|---|---|
| 1,700,517 | 1/1929 | Ross . |
| 1,818,605 | 8/1931 | Bruns .................................... 43/121 |
| 1,953,884 | 4/1934 | McAleer ............................ 206/525 |
| 2,123,995 | 7/1938 | Harroun ............................... 43/131 |
| 2,242,099 | 5/1941 | Wittwer . |
| 2,768,469 | 10/1956 | Mathias ............................... 43/131 |
| 4,182,070 | 1/1980 | Connelly . |
| 4,485,582 | 12/1984 | Morris . |
| 4,563,836 | 1/1986 | Woodruff . |

FOREIGN PATENT DOCUMENTS

| | | | |
|---|---|---|---|
| 411996 | 4/1925 | Fed. Rep. of Germany ........ 43/131 |
| 1515139 | 1/1967 | France ................................. 43/131 |

Primary Examiner—Nicholas P. Godici
Assistant Examiner—Karen Skillman
Attorney, Agent, or Firm—Fleit, Jacobson, Cohn & Price

[57] ABSTRACT

An insecticide bait holder for luring insects such as ants is in the form of a box having a top wall, a bottom wall and a peripheral wall connecting the top and bottom walls. The peripheral wall has score lines defining flaps which can be deformed inwardly to provide entrances to the box for insects. Annular ridges in the top and bottom walls form stops for the respective flaps limiting their inward deformation to acute angles which preclude straight line access to a bait holding station formed inwardly of the respective ribs. Thus, while insects can readily obtain access to the bait when the flaps are deformed inwardly, the flaps themselves form barriers precluding a child from readily obtaining access to the bait.

6 Claims, 1 Drawing Sheet

INSECTICIDE BAIT HOLDER

BACKGROUND OF THE INVENTION

Field of the Invention

This invention relates to an insecticide bait holder for luring and poisoning ants or other small insects such as roaches and the like.

Insect lures which incorporate poisonous bait or insecticide therein are quite well known. Examples of such lures may be found in the following prior U.S. Pat. Nos.:

1,700,517, Jan. 29, 1929,
2,242,099, May 13, 1941,
2,768,469, Oct. 30, 1956,
4,182,070, Jan. 8, 1980,
4,485,582, Dec. 4, 1984,
4,563,836, Jan. 14, 1986.

Considerations applicable to such lures are, for example, that they be economical and simple to manufacture, that they be simple to use and dispose of, that they should maintain the bait in a fresh, insect-attracting condition to the extent possible if exposed to lengthy shelf life, and that they should be tamper-resistant to the extent possible in preventing children or household pets from obtaining access to the poisonous bait.

It is an object of the present invention to provide a novel form of insecticide bait holder for luring and poisoning insects which fulfills at least certain of the above considerations.

SUMMARY OF THE INVENTION

An insecticide bait holder in accordance with the invention for luring insects and the like comprises a box, preferably made of tin plate, but which could also be made of plastic or other suitable material and having a top wall, a bottom wall, and a peripheral wall connecting the top and bottom walls, the peripheral wall defining at least one flap deformable inwardly about a fold line having a height dimension extending between the top and bottom walls so that the flap when deflected inwardly provides an entrance to the box for insects, an insecticide holding station located substantially centrally within the box, and stop means within the box between the peripheral wall and the insecticide holding station for limiting inward deflection of the flap to an acute angle and thereby precluding straight line access to the bait holding station from said entrance.

In a preferred form of the invention, for example, the box is made as a two part container of tin plate stampings, the first part defining the bottom wall and peripheral wall, the second part defining the top wall and the box having a peripheral crimp connecting the respective parts in a sealed somewhat airtight manner. The peripheral wall is formed with scoring defining the flap and in manufacture the bait, of any well known form, is positioned within the box. The somewhat airtight nature of the box enables it to be stored for lengthy periods prior to use without substantially affecting the freshness of the bait. Then, for use, the or each flap may be depressed inwardly by severing of the respective scoreline.

Because the or each flap can only be deflected inwardly by an acute angle, precluding straight line access to the centralized bait, this provides the box with a substantially tamper-proof facility since, for example, a child cannot obtain access to the bait by inserting a finger, stick or the like through the entrance defined by the inwardly deflected flap. However, access to the bait is available to an insect by circumscribing the stop means.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENTS

Figure 1:
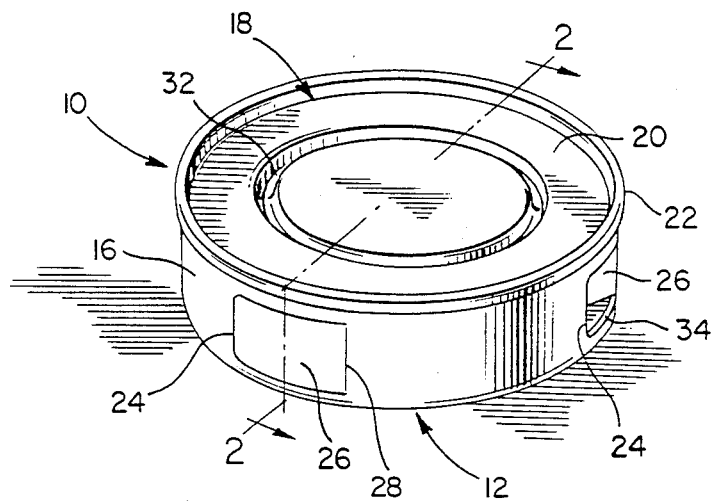
FIG. 1 is a perspective view of an insecticide bait holder in accordance with the invention.
Figure 2:
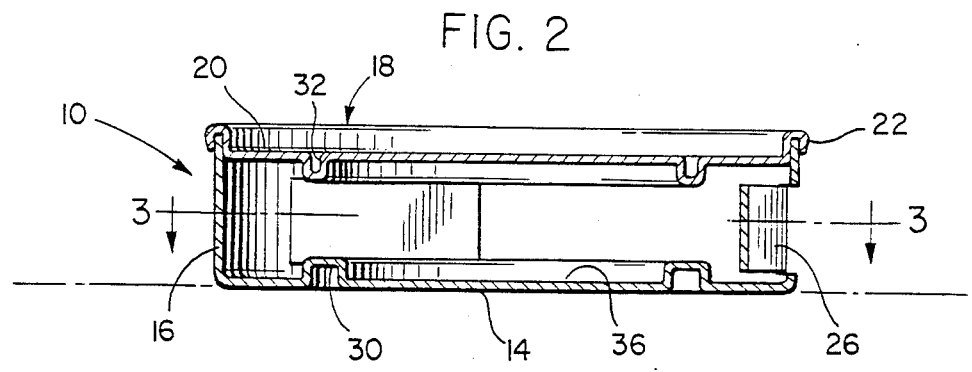
FIG. 2 is an enlarged sectional view on line 2—2 of FIG. 1.

An insecticide bait holder 10 in accordance with the invention comprises a first tin plate stamping 12 defining a bottom wall 14 and an annular circumferential wall 16 and a second tin plate stamping 18 defining a top wall 20, the respective stampings being connected in a substantially airtight manner by means of a circumferential crimp 22, for example. For luring ants and other small insects, the holder may have a diameter of about three inches and a height of about ⅜ inch.

Figure 3:
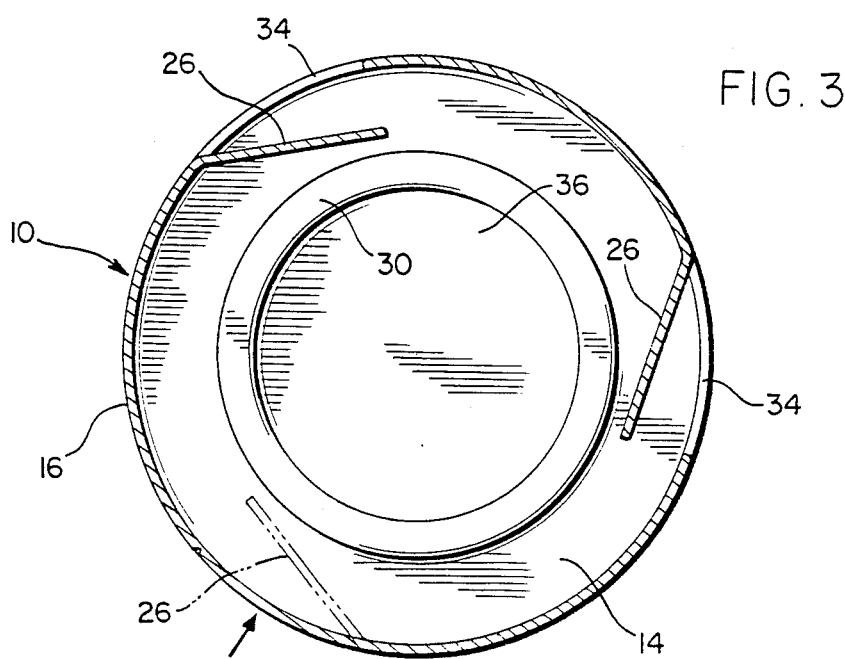
FIG. 3 is a sectional view on line 3—3 of FIG. 2.

The circumferential wall 16 of the holder is provided with three circumferentially spaced channel-shaped score lines 24 (FIG. 1) defining respective flaps 26 each of which can be deflected inwardly under manual pressure by severing the respective score lines, the flaps being deformable about respective imaginary fold lines 28 each having a height dimension extending between the top and bottom walls of the holder. Further, the bottom wall is stamped with an inwardly and upwardly projecting annular rib 30 and a similar annular rib 32 substantially aligned with rib 30 is formed in the top wall 20. The ribs 30 and 32 together define stop means for limiting the inward deflection of each tab 26 to an acute angle (from their original positions) as clearly seen in FIG. 3. The openings 34 in the peripheral wall which are formed by inward depression of the respective flaps provide entrances to the interior of the box for insects but the positioning of the flaps in the acute angled positions as limited by the stops 30 and 32 precludes straight line access from the respective openings 34 to the central depressed section 36 of the bottom wall which in use forms a pan for any well known form of poisonous insect bait or insecticide (not shown). Thus, it will be evident, that insects can readily obtain access to the bait through the entrances 34 but the flaps 26 prevent a child, for example, obtaining straight line access to the bait with a finger or elongate instrument. Accordingly, the device is provided with an effective tamper-proof facility.

It will also be appreciated that the airtight nature of the holder prior to inward deflection of the flaps 26 allows the stored bait to be maintained in a fresh condition prior to use. While the device has been described as being of circular shape in plan, it could be of a rectangular or other geometric shape.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An insecticide bait holder for luring insects and the like comprising a box having a top wall, a bottom wall, and a peripheral wall connecting the top and the bottom walls, the peripheral wall having at least one opening therein defining at least an entrance to the box for insects, an insecticide holding means located within the box, a movable closure flap for said opening mounted on said peripheral wall and stop means within the box between the peripheral wall and the insecticide holding means for limiting inward movement of the flap to an acute angle and thereby precluding straight line access to the insecticide holding means from said entrance, said means including an upwardly extending ridge in the bottom wall.

2. The invention as defined in claim 1 wherein the ridge is substantially annular and defines the insecticide holding station internally thereof.

3. The invention as defined in claim 1 wherein the stop means further includes a downwardly extending ridge in the top wall aligned with the upwardly extending ridge.

4. An insecticide bait holder for luring insects and the like comprising a box having a top wall, a bottom wall, and a peripheral wall connecting the top and the bottom walls, the peripheral wall having at least one opening therein defining at least an entrance to the box for insects, an insecticide holding means located within the box, a movable closure flap for said opening mounted on said peripheral wall and stop means within the box between the peripheral wall and the insecticide holding means for limiting inward movement of the flap to an acute angle and thereby precluding straight line access to the insecticide holding means from said entrance, said closure flap having a portion of its edge integral with the peripheral wall with the remainder of the edge being free of the peripheral wall and conforming in shape and configuration to the opening to form a closure for the opening when in alignment with the peripheral wall, said flap being constructed of bendable material to enable inward deflection of the flap in order to open the opening with the flap being positioned to require insects to pass around the free edge portion of the flap to gain access to the insecticide holding means, said insecticide holding means including an annular inwardly extending ridge on at least one of said top and bottom walls with the inner edge of the ridge lying in the path of movement of a portion of the free edge of the flap when the flap is bent inwardly to limit the inward movement of the flap.

5. The insecticide bait holder as defined in claim 4 wherein said opening and flap are generally of rectangular configuration with the major dimension of the opening and flap extending peripherally of the peripheral wall with one end of the flap being integral with the peripheral wall with the remainder of the flap swinging inwardly about an axis defined by the edge of the flap integral with the peripheral wall, the radial dimension between the peripheral wall and the ridge being less than the length of the flap to retain the flap in acute angular relation to the peripheral wall and the ridge to require insects to move around the free edge portion of the flap to gain access to the insecticide holding means.

6. An insecticide holder comprising a container of generally cylindrical configuration and including a cylindrical peripheral wall and parallel top and bottom walls connected together in sealed relation with the container being short in vertical height, each of said top and bottom walls including an inwardly extending annular ridge concentric with and spaced inwardly from the peripheral wall with the inner edges of the ridges being spaced apart a distance less than the height of the peripheral wall and adapted to retain an insecticide bait within the confines of the annular ridges, said peripheral wall including a plurality of circumferentially spaced openings therein with each opening being generally rectangular in configuration and having a major dimension extending circumferentially of the peripheral wall, each opening including a closure flap having substantially the same dimension as the opening and having one end edge integral with an end edge of the opening and the top and bottom edges and the other end edge of the flap being connected to the peripheral wall by a weakened score line thereby enabling the end of the flap connected to the edge of the opening by a weakened score line to be moved inwardly to deflect the flap inwardly, the radial space between the peripheral wall and the ridges being less than the length of the flap so that when the flap is deflected inwardly, the free end edge thereof will engage the ridges to limit the flap to acute angular relation to the peripheral wall and ridges thereby assuring that insects entering the opening must pass around the edge of the flap rather than having direct straight line access to the interior of the ridges and insecticide bait therein, the vertical height of the flap being greater than the space between the inner edges of the ridges to assure that the flap will come into contact with the ridges when deflected inwardly, one of said top and bottom walls being integrally formed with the peripheral wall and the other of said top and bottom walls being permanently secured to the edge of the peripheral wall by a crimp joint to provide a permanent enclosure for the interior of the container with the only access thereto being through the peripheral openings.

* * * * *